(12) United States Patent
Turner et al.

(10) Patent No.: US 12,244,573 B2
(45) Date of Patent: Mar. 4, 2025

(54) SECURING METRICS IN A SERVICE MESH

(71) Applicant: MICROSOFT TECHNOLOGY LICENSING, LLC, Redmond, WA (US)

(72) Inventors: James Warren Turner, London (GB); Christopher James Paterson, Hertford (GB); Alex John Hockey, London (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 297 days.

(21) Appl. No.: 17/841,909

(22) Filed: Jun. 16, 2022

(65) Prior Publication Data

US 2023/0412572 A1    Dec. 21, 2023

(30) Foreign Application Priority Data

Apr. 28, 2022  (GB) .................................. 2206159.2

(51) Int. Cl.
  *H04L 9/40*    (2022.01)
  *H04L 61/5007*  (2022.01)
(52) U.S. Cl.
  CPC ...... *H04L 63/0428* (2013.01); *H04L 61/5007* (2022.05)
(58) Field of Classification Search
  CPC .................... H04L 63/0428; H04L 61/5007
  See application file for complete search history.

(56) References Cited

U.S. PATENT DOCUMENTS

| | | | | |
|---|---|---|---|---|
| 2021/0243164 | A1* | 8/2021 | Murray | H04L 61/4511 |
| 2021/0328858 | A1* | 10/2021 | Asveren | H04L 61/5007 |
| 2023/0168995 | A1* | 6/2023 | Retnasaba | G06F 11/3006 |
| | | | | 717/124 |
| 2023/0254284 | A1* | 8/2023 | McCord | H04L 41/12 |
| | | | | 726/15 |

OTHER PUBLICATIONS

Kubernetes, by Gupta, published 2018 (Year: 2018).*
"Concepts", Retrieved from: https://github.com/dohsimpson/kubernetes-doc-pdf/raw/a5a0a15050249de56fcadd332840dd5932219ad9/PDFs/Concepts.pdf, Sep. 5, 2020, 618 Pages.
Melton, Ryan, "Securing a Cloud-Native C2 Architecture Using SSO and JWT", In Proceedings of IEEE Aerospace Conference, Mar. 6, 2021, 8 Pages.
"International Search Report and Written Opinion Issued in PCT Application No. PCT/US23/013367", Mailed Date: May 31, 2023, 13 Pages.

* cited by examiner

Primary Examiner — Vu V Tran
(74) Attorney, Agent, or Firm — Han Gim; Newport IP, LLC (57) ABSTRACT

Information is provided to a service mesh by a Kubernetes (K8s) controller. The information enables the service mesh to determine an IP address of application pods to which a monitoring request is destined. The K8s controller detects which of the application pods are scheduled to be monitored by the monitoring service. The K8s controller creates dummy headless services that match the application pods scheduled to be monitored. The service mesh is programmed information from the dummy headless services to cause the service mesh to intercept the monitoring request and identify that the monitoring request is destined to the dummy headless service based on the addresses. In response the service mesh encrypts the monitoring request.

20 Claims, 5 Drawing Sheets

SECURING METRICS IN A SERVICE MESH

CROSS-REFERENCE TO RELATED APPLICATION(S)

This non-provisional utility application claims priority to UK patent application number 2206159.2 entitled "SECURING METRICS IN A SERVICE MESH" and filed on 28 Apr. 2022, which is incorporated herein in its entirety by reference.

BACKGROUND

When implementing zero trust it is necessary to encrypt all network communications between machines and ensure that the machines authenticate and authorize other machines. For Transmission Control Protocol (TCP) connections this is normally implemented using mutual Transport Layer Security (mTLS).

In Kubernetes™ (also known as K8s™) related environments this is typically achieved by a service mesh. The service mesh is installed in a K8s cluster and automatically performs encryption, authentication, and authorization.

In a K8s cluster, with hundreds of pods, it is useful to aggregate metrics information about the health of the pods into one place where the information can be viewed and processed. Prometheus™ is a widely used solution for collecting metrics.

Prometheus uses a model to scrape pod metrics and the service meshes in K8s use a model to identify traffic requiring TLS uplift. The Prometheus and a service mesh model are incompatible and as a result the metrics scrapes conducted by Prometheus are unsecured. The present invention seeks to provide an alternative approach which overcomes the incompatibility and at least some of the problems of present systems.

The embodiments described below are not limited to implementations which solve any or all of the disadvantages of known systems.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A method, system and media for providing information to a service mesh from a Kubernetes (K8s) controller, the information to enable the service mesh to determine an IP address of one or more application pods to which a monitoring request destined for one of the one or more IP addresses, is to be sent from a monitoring service, the method comprising detecting, via the K8s Controller, which of the one or more application pods are scheduled to be monitored by the monitoring service from a service monitor associated with the monitoring service and an application service; creating, via the K8s Controller, dummy headless services that match with the one or more application pods scheduled to be monitored; and programming the service mesh with the dummy headless service information from the dummy headless services to cause the service mesh to intercept and identify that the monitoring request is going to a dummy headless service based on the one of the one or more IP addresses so as to encrypt the monitoring request.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

Although the present examples are described and illustrated herein as being implemented in a network management system that is capable of meeting zero trust requirements, the system described is provided as an example and not a limitation. As those skilled in the art will appreciate, the present examples are suitable for application in a variety of different types of network management systems, including by way of example a cloud based network management system.

Described herein is an improved Kubernetes system and method having a monitoring service or methodology. This relies on K8s concepts including a service model and "normal" and "headless" services which be described in greater detail below.

K8s is concerned with automated management of applications by facilitating automated deployment, scaling, and management of containerized applications.

Figure 1:
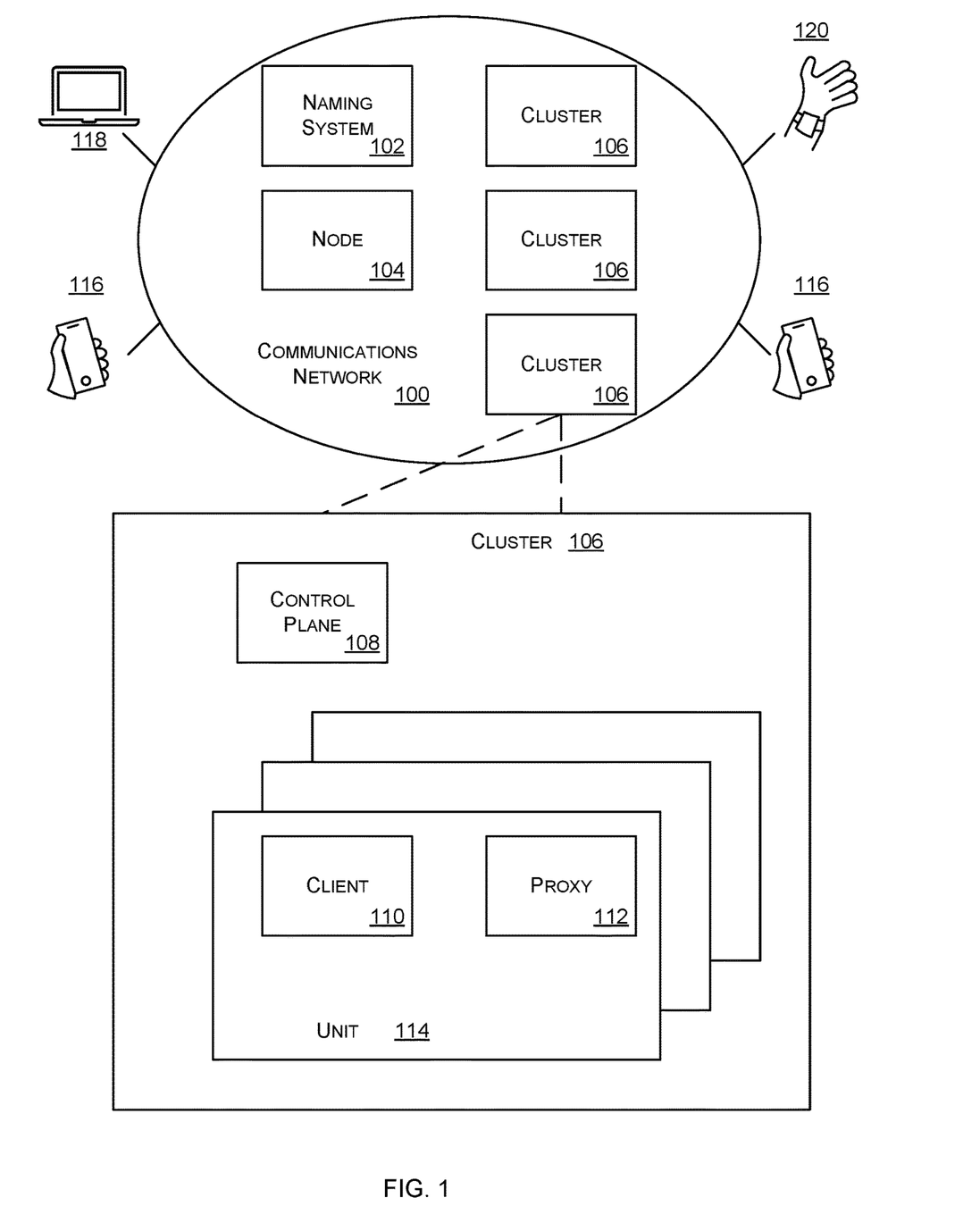
FIG. 1 is a schematic diagram of a communications network containing a plurality of clusters for providing one or more services in a secure manner according to the present invention.

FIG. 1 shows a communications network 100 containing one or more clusters 106 for providing one or more services in a secure manner A subscriber to a service, such as a smart phone 116, laptop computer 118, smart watch 120 is able to access the service via the communications network 100. In an example, the service is a telephony service such as a mobile voice mail service. Other examples of services are any voice over internet protocol service. Other examples of services are voice over IP services, 4G and 5G packet cores, Robocall services, and voice core services in general. The communications network may be based on a cloud computing environment provides centralized resources which can be accessed by the external systems and resources. The centralized resources include one or more of an application, a platform, an infrastructure, storage, network tools, security related resources, a voice mail service, etc.

The communications network comprises a naming system 102 such as a domain name system 102 as well as a node 104 such as a session border controller, router, load balancer or any other communications network node. A request for a service is sent by one of the subscriber devices and received at node 104. Node 104 sends a request for the service to the naming system 102 which returns an address of one of the clusters according to its knowledge of available capacity at the clusters, load balancing rules and other factors. The address of the specified cluster is used by the node 104 to forward traffic from the subscriber device to the specified cluster.

FIG. 1 shows three clusters 106 although in practice there are many hundreds or thousands of clusters. FIG. 1 shows an exploded view of one of the clusters 106 comprising a control plane 108 and a plurality of units 114. The units are smallest deployable units of a service such as a telephony service. In an example the units are Kubernetes pods where the service is orchestrated using Kubernetes.

FIG. 1 shows three pods 114 although in practice there are hundreds or thousands of pods 114 in a cluster 106.

Where the service deployed using the clusters 106 is to be secure, security is achieved within each cluster by using a service mesh within each cluster 106. A service mesh in a cluster 106 comprises a control plane 108 and a plurality of proxies, one in each of the pods 114; that is, each unit comprises a proxy 112 and a client 110 or server. Where a client 110 is present in a pod 114 the client 110 has ability to request functionality of the service from a server. Where a server is present the server has functionality of the service.

Zero trust communication means sending encrypted traffic over a session between parties where the parties have mutually authenticated one another. In some cases, zero trust communications also includes mutual authorization of the parties to the session. It is important that all traffic is trusted to avoid potential for a security breaches. The traffic may contain content which is to be kept secure such as passwords or other confidential information.

When deploying services in a zero trust manner it is desired to encrypt network communications between machines (such as the machines on which the pods 114 and the cluster or clusters 106 are executing) and ensure that pods 114 authenticate and authorize the other pods 114 they talk to. For transport control protocol (TCP) connections within a cluster 106 (such as between pods 114) this may be done using mutual transport layer security (mTLS). However, it is not essential to use mutual transport layer security as other protocols which are secure and include mutual authentication may be used.

In order to ensure that a secure communications protocol with mutual authentication is used within a cluster 106 it is possible to use a service mesh. The service mesh is installed in the cluster, and automatically performs encryption, authentication and optionally authorization. This is achieved by installing a sidecar proxy 112 (which is optionally a container) into every pod 114, along with network routing rules to redirect traffic via the proxy 112. There is also a control plane 108 that runs inside the cluster 106. It programs the proxies 112 with rules to handle traffic and enforce security policy.

The pod is the smallest deployable unit in K8s which is running an application providing a service. A service is an abstraction in front of a number of pods providing resource management functions such as load balancing between the pods.

If one or more of the pods fail or are rescheduled, the service stays the same. This ensures a service can always be accessed, being passed to a different pod to undertake the actual work required to provide the service. There is generally a mapping between the services and which pod/pods can be used to implement the service.

The pod includes the one or more containers and storage, network resources and instructions on how to operate the container.

The container is a package including an application or service and all the resources required to run the application or service in a single location.

The node comprises a virtual or physical machine, depending on the nature of the cluster. Each node includes a number of components which provide the services necessary to run a pod.

Multiple pods are combined in a cluster and each pod is distinctive but depends on the other pods in the cluster.

In K8s, it is generally assumed that pods will discover and talk to one another through a service. The service creates a domain name: a client that resolves the name receives one of two things, depending on the type of service. For a normal service, a virtual IP address is received and connections are load balanced across the pods by K8s. For a headless service, a list of the underlying pod IP addresses is received, and the client must do any necessary load balancing. A headless service is one which does not allocate an IP address or forward traffic.

Figure 2:
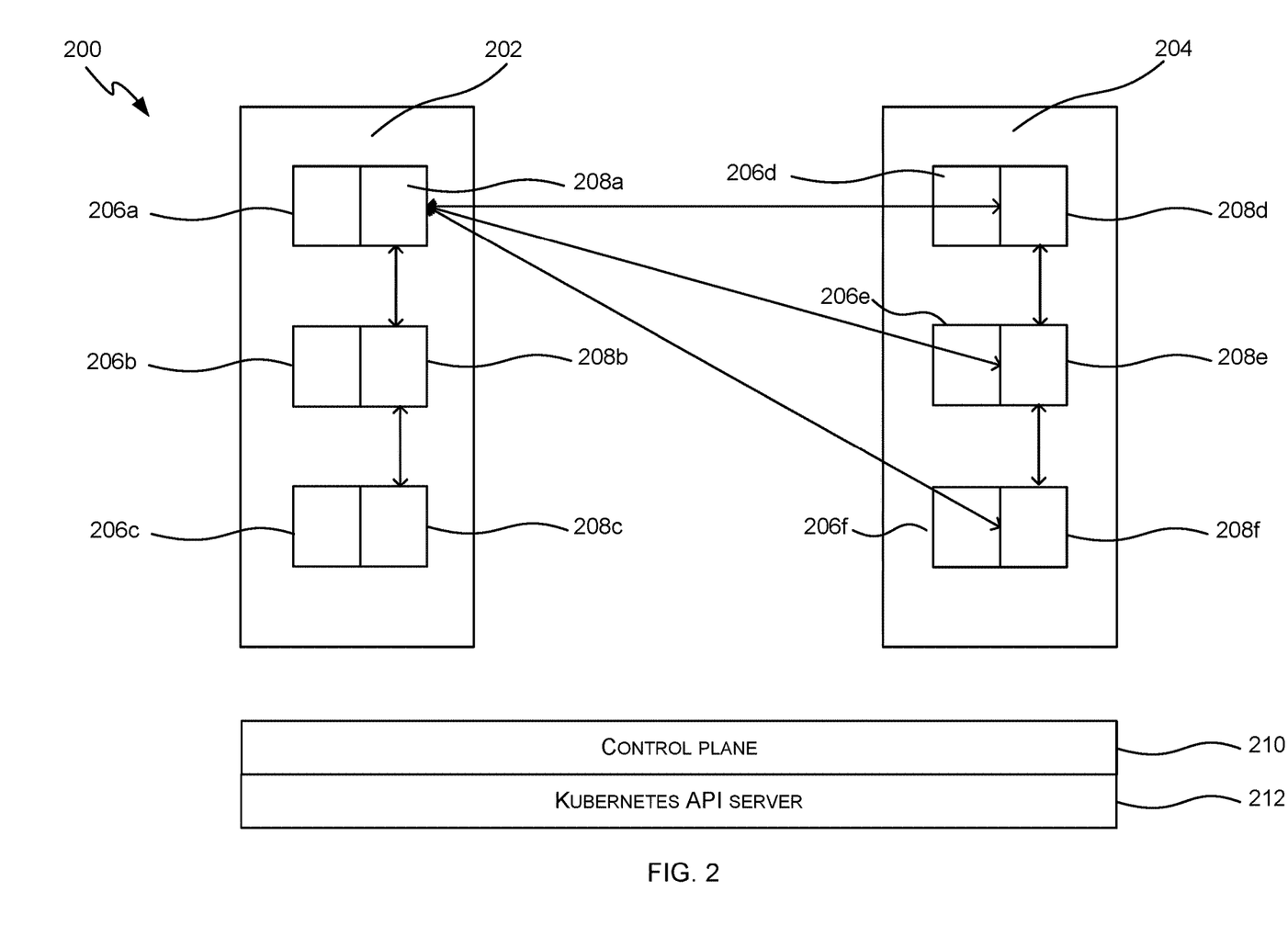
FIG. 2 is a schematic drawing of a Kubernetes architecture including a service mesh.

The service mesh identifies traffic that it needs to uplift to mutual Transport Layer Security (mTLS) by querying K8s for all services and comparing the destination of the traffic against a domain name, an IP address and a port associated with the services. If there is no match, the traffic will not be uplifted.

Where a telephony service or application is deployed in the cloud the functionality of the service is typically provided using a plurality of clusters, each cluster comprising one or more compute nodes that provide the necessary functionality and provides at least part of the service. In an example, the service is a telephony service such as a mobile voice mail service. Other examples are services are voice over IP services, 4G and 5G packet cores, Robocall services, and voice core services in general. FIG. 2 shows a simplified K8s cluster containing a service mesh 200. The K8s cluster includes a number of nodes 202 and 204. There can be many more nodes than shown. A first node 202 includes a number of pods 206a, 206b, and 206c and associated proxies 208a, 208b and 208c. A second node 204 includes a number of pods 206d, 206e, and 206f and associated proxies 208d, 208e and 208f. There could be more or less pods and associated proxies than shown. In some cases, this can be many hundreds and even thousands. The proxies are sometimes referred to as a "sidecar" of the pod. The proxies in a single node all communicate with one another and each one communicates with the proxies in the other nodes (only some of the lines of communication are shown, to avoid confusion).

The service mesh 200 includes a control plane 210 and is in communication with a K8s API server 212. Each of the proxies in all of the nodes receive programming from the control plane 210.

The control plane 210 includes a number of components which program proxies. The K8s API server 212 exposes a Hypertext Transfer Protocol (HTTP) API that provides create, read, update, and delete objects including pods, services etc. in the K8s cluster.

In many situations the network needs to be monitored. This means that every resource in the network is asked to provide metrics and communicate these back to a monitoring tool. Users often rely on a system called Prometheus to serve as the monitoring tool. It will be appreciated that Prometheus is one example of a monitoring tool that could be used in network monitoring, other monitoring applications may equally apply.

A service monitor is an element of configuration defining which pods Prometheus is scheduled to monitor (also known as scraping) and a Prometheus operator reads (or detects) the Service Monitor by querying the K8s API server for the set of ServiceMonitor objects. Based on the information in the Service Monitor, the Prometheus Operator programs the Prometheus server to scrape the Pods that the ServiceMonitor says should be scraped. A user further advises K8s about PodMonitors object types by creating custom resource definition objects defining the structure of the PodMonitor.

The Prometheus server needs to send scrapes to all of the individual pods that are detected as being scheduled to be monitored. This means the Prometheus server needs to know application pod IP address rather than the service IP address in order to send a monitoring request to every single pod When a service mesh is installed, the Prometheus servers send the requests via a service mesh proxy.

The service mesh proxy is programmed with application service information by the service mesh control plane. This information is derived from the application service.

The service mesh proxy intercepts a scrape to the application pod IP addresses from the Prometheus server. The service mesh proxy does not know anything about application pod IP addresses, as the service mesh proxy has been configured with information about services, namely the service IP address and not the application pod IP address. The service mesh proxy recognizes that the intercepted address is unknown and lets the request through without applying mTLS i.e., the request is in plaintext. The application pod rejects the plaintext message, or the application pod responds in plaintext. Both are undesirable and expose the system to potential malicious third parties that can sniff the system and can capture the plaintext messages which may then be used to learn more about the system as a whole. This is a significant problem when using a combination of service mesh and Prometheus.

There have been a number of proposals to determine how to enable Prometheus to scrape pods in a secure manner so that no scrapes are sent in plaintext. These proposals are fraught with problems and require significant changes to the system in general. Other problems include the lack of security, the requirements to change the configuration in Prometheus and changes to the pods which makes the systems complicated and long to implement. The proposals also lack maintainability and are costly to put into effect.

The improved system described herein is a system to provide a cloud based voice mail service and which enables end to end secure communication in a combined monitoring and K8s environment. It will be appreciated that system is not limited to cloud based voice mail systems but instead can be used in any system which include incompatibilities in addressing requests.

Figure 3:
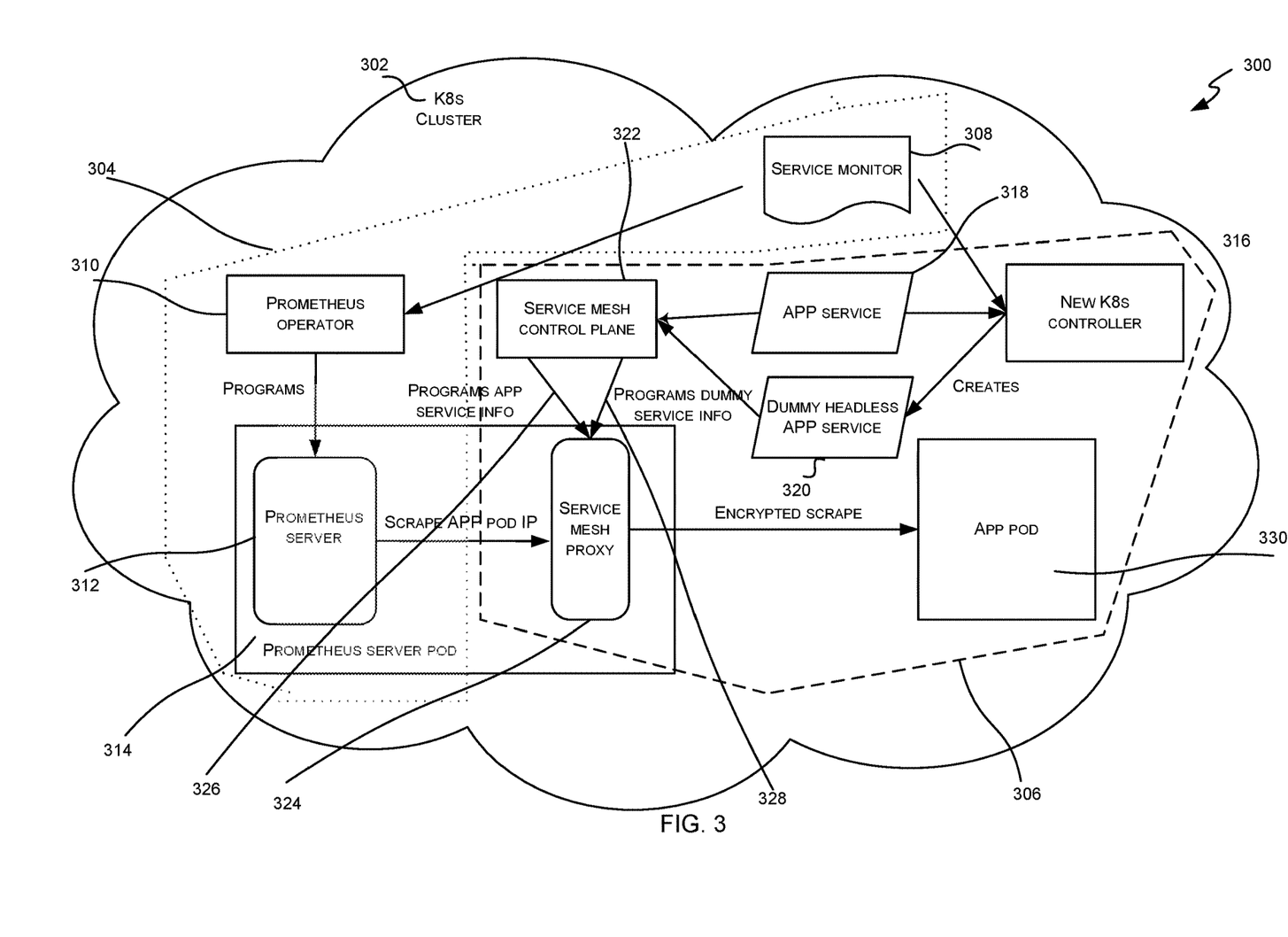
FIG. 3 is a schematic diagram showing a Kubernetes architecture operating with a monitoring system for collecting metrics according to the present invention.

FIG. 3 shows a cloud based K8s architecture 300. The cloud based K8s architecture 300 includes one or more K8s clusters 302 only one of which is shown. The cloud based K8s architecture 300 includes a monitoring environment 304 surrounded by a dotted line and a K8s environment 306 surrounded by a dashed line. In this case the monitoring tool is a Prometheus component.

The Prometheus environment 304 includes a service monitor 308, a Prometheus operator 310 and a Prometheus server 312 in a Prometheus server pod 314. The service monitor 308 is used to determine which pods should be monitored and the nature of any required metrics and is a configuration for Prometheus.

The Prometheus operator 310 is watching the K8s API server for new Prometheus-specific objects and determines that a new service monitor has been created.

The Prometheus operator 310 detects the PodMonitors and the ServiceMonitors which define which collections of pods and/or services are scheduled to be monitored and how to monitor them. The Prometheus operator 310 then configures the Prometheus server 312 with individual metrics collection targets and rules to do this.

The Prometheus server 312 provides the resources to carry out real time measurement of metrics using an HTTP pull model using real time alerting and the ability to use queries.

The Prometheus server is unaware that the service mesh proxy exists and believes the scape request or scrape is going directly to the application pod. The service mesh proxy intercepts the scrape and is unable to identify the service to which the scrape is going and so sends it on unaltered (i.e., in plaintext). This is dues to the incompatibilities of service mesh and Prometheus. The result is the metrics would not be collected or collected in plain text which adds insecurity.

In accordance with the improved system described herein the K8s component 306 is enabled to send a scrape or monitoring request as encrypted scrapes, rather than plaintext. This clearly overcomes the many issues associated with the incompatibilities of service mesh and Prometheus The K8s component 306 has a new configuration and includes a new K8s controller 316. The new K8s controller 316 receives information from the service monitor 308 and an application service 318 and creates a dummy headless application service 320. A service mesh control plane 322 learns the application services 318 and the new dummy headless services 320 by querying K8s about all the services. The service mesh control plane 322 then programs a service mesh proxy 324. Based on this new configuration the service mesh proxy 324 is able to encrypt any scrape or monitor instruction from the Prometheus server 312, as will be described below.

The new K8s controller 316 is deployed into the K8s cluster 302 and is configured to detect information from the service monitor 308 and the application service 318 relating to one or more application pods 330 which are scheduled to be scraped or monitored. The detected information includes but is not limited to PodMonitors and ServiceMonitors.

The new K8s controller 316 is further configured to create new dummy headless services 320 that match with the same pods that have been identified from the detection of information from the service monitor 308. In the case of PodMonitors, the dummy headless service 320 uses the same pod selection criteria as the PodMonitor. In the case of ServiceMonitors, a dummy headless service 320 is created for each normal service that matches the criteria identified in the ServiceMonitor. The dummy headless service selects the same pods as the normal service.

There is a difference between a normal service and a headless service. The application service 318 is an example of a normal service has an IP address sometimes referred to as cluster IP address. Accordingly, if a client wants to contact this service an actual IP address will be returned to the client that then sends a request to that IP address and thereby load balances one of the pod IP addresses.

By contrast the dummy headless service 320 does not include a different cluster or virtual IP address and comprises a list of underlying IP addresses for the pods identified by the K8s controller 316. Accordingly, if a client wants to contact a headless service, Domain Name System (DNS) query will return a list of underlying IP addresses, and the client has the responsibility to determine to which of the application pods to send the request. Because a dummy headless service has no cluster IP address, the service mesh uses the underlying pod IP addresses to identify traffic to a headless service.

The service mesh control plane 322 receives data from each of the application service 318 and the dummy headless service 320 and programs the service mesh proxy 324 with application service information 326 and with dummy headless service information 328.

The service mesh proxy intercepts a scrape or monitoring request including an IP address (destination IP address) and, because of the dummy headless application service 320, the service mesh proxy is also in receipt of a list of IP addresses of the actual application pods. The service mesh proxy 324 can then identify the service to which the scrape corresponds and uplifts mTLS to encrypt the monitoring request. The encrypted monitoring request is sent to the application pod 330 based on the destination IP address of the pod. The dummy headless services allow the service mesh to identify, and thus secure, all Prometheus metrics scrapes. No changes are required to the underlying application other than to ensure that the new K8s controller is operational. The existing architecture is not redesigned. Instead, the controller is installed and automatically carries out its functionality.

Depending on the precise configuration of the monitors, the new K8s controller 316 is not able to construct the correct dummy headless services 320 until some of the underlying pods and/or services have been created. In this case, the new K8s controller 316 defers the creation until it has all the information it requires.

In some cases, when using Prometheus, it is configurable to annotate the pods that Prometheus should collect metrics from. The new K8s controller 316 is extendable to cover this approach, by watching for pods created with that annotation and creating new Dummy services that matched on those pods.

Figure 4:
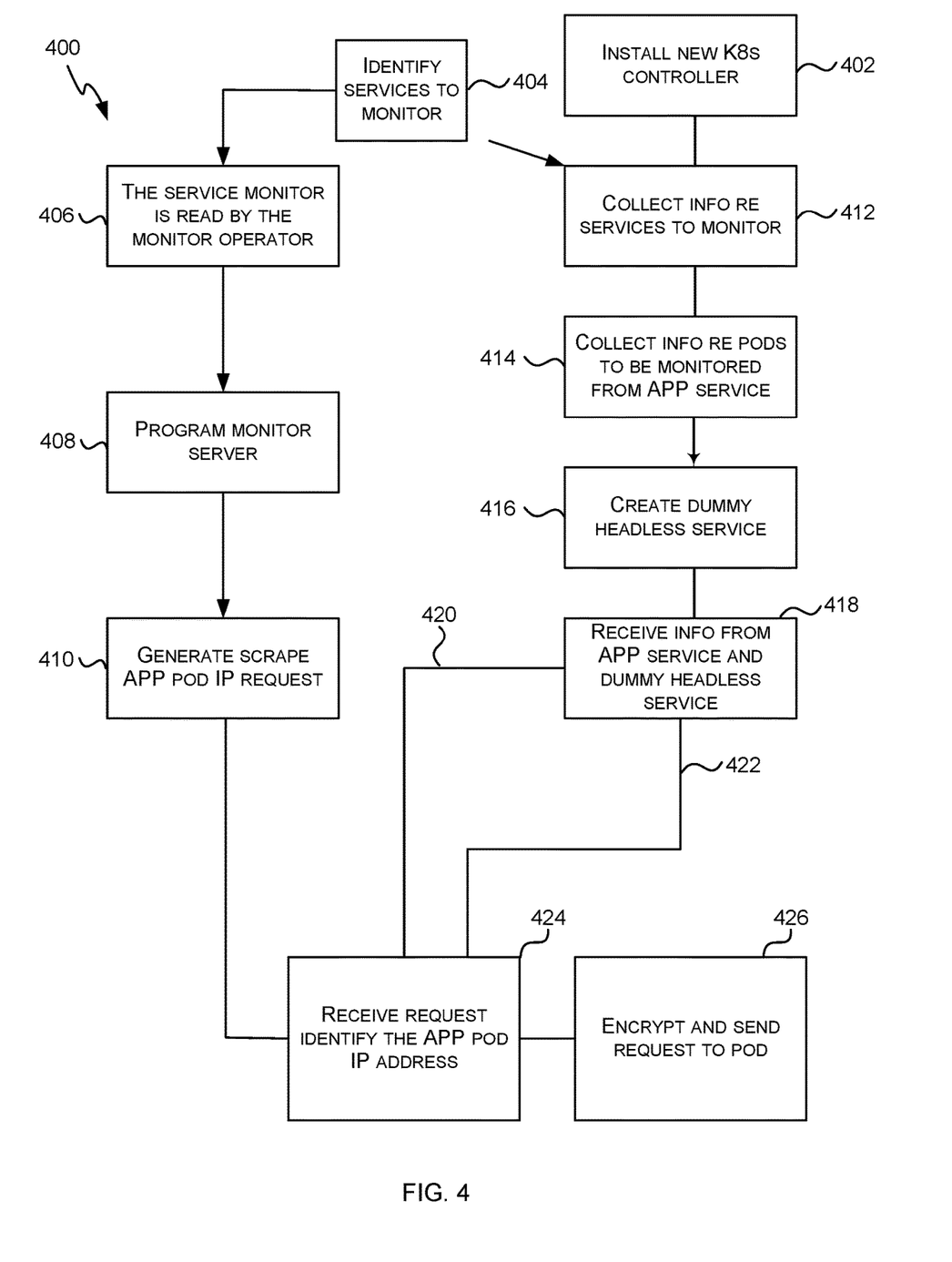
FIG. 4 is a flow diagram of a method for operating a service combining a Kubernetes environment with a monitoring system.

The improved method described herein also relates to a method for providing services and ensuring all scrapes are encrypted despite any incompatibilities between the service mesh and a monitoring service. The method 400 is shown in FIG. 4.

A new K8s controller 316 is installed in the K8s cluster 302 in block 402.

A service monitor 308 identifies services that are scheduled to be monitored in block 404. In block 406, the service monitor is read by a monitor operator (for example Prometheus operator 310).

In block 408 a monitor server (such as Prometheus server 314) is programmed. A metrics scrape to the application pod IP address is sent in block 410.

The new K8s controller 316 collects information from the service monitor 308 which indicates the services which are scheduled to be monitored in block 412. The new K8s controller 316 collects information from the application service 318 which indicates the pods which are scheduled to be monitored in block 414. The new K8s controller 316 creates new dummy headless service 320 in block 416. This is an automatic process which is initiated by the detection of relevant information from the service monitor.

The information from the application service 318 and the new dummy headless service information 320 are read by a service mesh control plane 322 in block 418. The service mesh control plane 322 programs application service information 326 into the service mesh proxy 324 in block 420 and programs dummy headless service information 328 into the service mesh proxy 324 in block 422.

At block 424 the service mesh proxy receives the scrape application pod IP address request in block 410 and determines application pod IP address from the IP address in the request. The service mesh proxy uses the dummy headless service information to identify that the request is going to the dummy headless service and therefore needs to be mTLS uplifted. An encrypted request is then sent to the application pod in block 426.

The architecture and method of the improved system and method described herein is adaptable to any service requirement using a K8s based architecture in which monitoring is required. Prometheus is just one example of a monitoring service and could be replaced by others. It is understood that different monitoring services are likely to have similar incompatibilities although not the same. In this case the functionality of the new K8s controller 316 would be altered to adjust to the precise nature of the incompatibilities.

The new K8s controller 316 can work with any other monitoring services by determining what, if any, mismatch there is between service mesh and the monitoring service. The new K8s controller 316 provides the application service information 326 and the dummy headless service information 328 to the service mesh proxy 324 to identify that a monitoring request is going to a dummy headless service based on the destination IP addresses so as to encrypt the monitoring request.

In respect of the natures of the service the uses of the improved system and method described herein are limitless and can include any service required in a cloud based environment, including, and not limited to voicemail systems.

The technical effect of the new K8s controller 316 is to enable encryption of traffic where there are incompatibilities between the service mesh and other functionalities including but not limited to monitoring and collecting metric from anywhere in the service. The improved K8s system and method offer the ability to use a new K8s controller 316 which allows a service mesh proxy to identify that the monitoring request is going to a dummy headless service based on the destination IP addresses so as to encrypt the monitoring request.

The new K8s controller 316 is simple to integrate and does not require any changes to the underlying application. It is merely necessary to ensure that the new K8s controller 316 is installed in K8s. The generation of dummy headless services allows the service mesh proxy to identify that the monitoring request is going to a dummy headless service based on the destination IP addresses so as to encrypt the monitoring request. As the monitoring request is encrypted the application pod can receive and accept the monitoring request and send the relevant response in terms of metrics or other information.

As the request and response are encrypted there is no chance of information to be intercepted by malicious third parties.

Dummy headless services 320 are created automatically by the new K8s controller 316. This means any new pods added to the K8s cluster will automatically get secured metric scrapes. This is achieved by making use of the existing technology (certificates, proxies) of the service mesh to secure the traffic.

Figure 5:
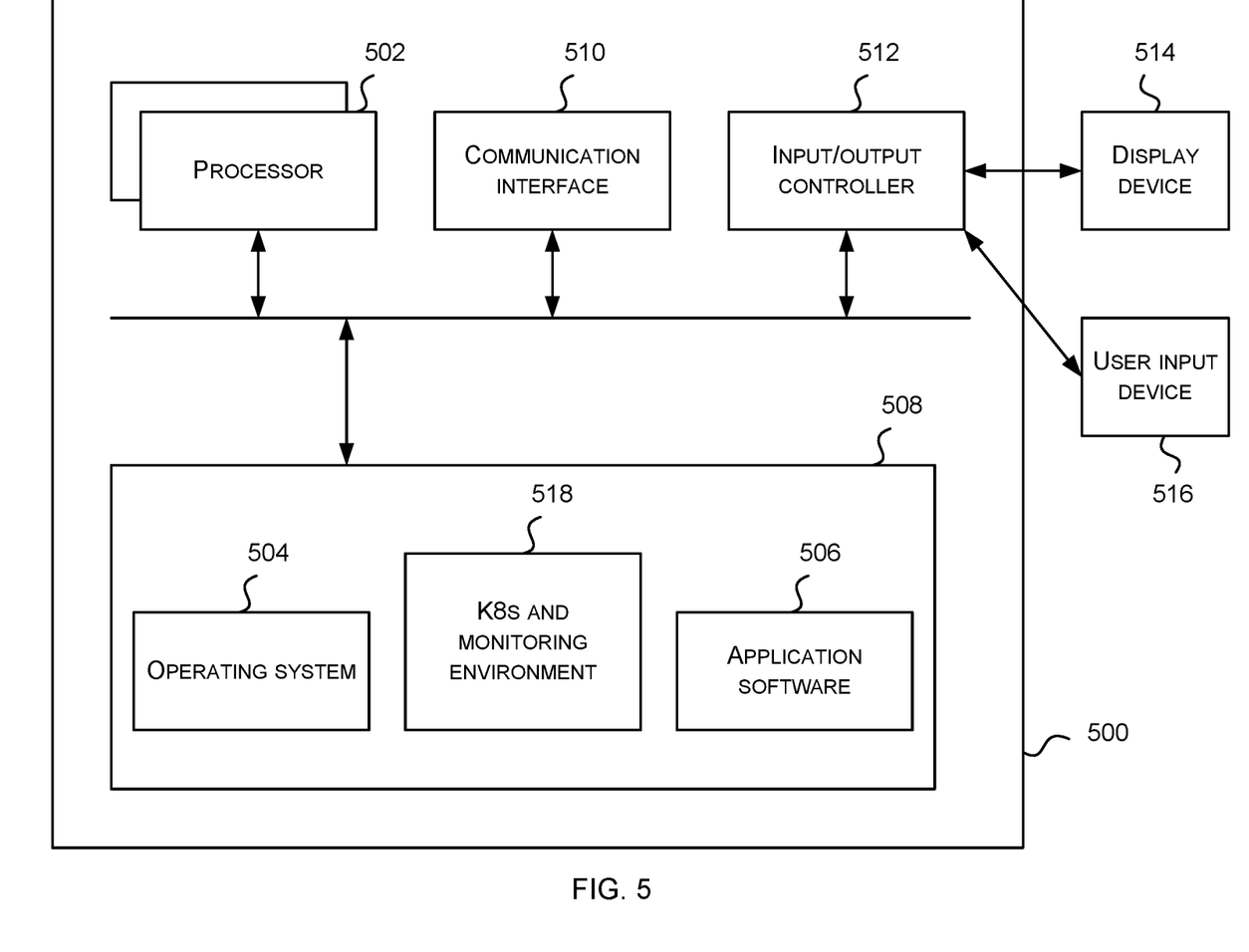
FIG. 5 illustrates an exemplary computing-based device in which embodiments of the FIG. 3 architecture are implemented.

Components of an exemplary computing-based device 500 which are implemented as any form of a computing and/or electronic device, and in which embodiments of an improved Kubernetes system and method having a monitoring service or methodology are implemented in some examples.

Computing-based device 500 comprises one or more processors 502 which are microprocessors, controllers, or any other suitable type of processors for processing computer executable instructions to control the operation of the device. In some examples, for example where a system on a chip architecture is used, the processors 502 include one or more fixed function blocks (also referred to as accelerators) which implement a part of the method of improved Kubernetes a monitoring service or methodology in hardware (rather than software or firmware). Platform software comprising an operating system 504 or any other suitable platform software is provided at the computing-based device to enable application software 506 to be executed on the device.

The computer executable instructions are provided using any computer-readable media that is accessible by computing based device 500. Computer-readable media includes, for example, computer storage media such as memory 508 and communications media. Computer storage media, such as memory 508, includes volatile and non-volatile, removable, and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 508) is shown within the computing-based device 500 it will be appreciated that the storage is, in some examples, distributed or located remotely and accessed via a network or other communication link (e.g., using communication interface 510).

The computer-based device 500 can include other functionality including but not limited to an input/output controller 512 which communicates with an internal or remote display device 514 and an internal or external user input device 516. The K8s and monitoring environment is in located either within the computing system 518 as shown in FIG. 5. In a cloud based environment some or all of the elements forming part of the computer-based device 500 can be located in a central cloud resource Alternatively or in addition to the other examples described herein, examples include any combination of the following:

A first example comprises a method of providing information to a service mesh from a Kubernetes (K8s) controller, the information to enable the service mesh to determine an IP address of one or more application pods to which a monitoring request destined for one of the one or more IP addresses, is to be sent from a monitoring service, the method comprising detecting, via the K8s Controller, which of the one or more application pods are scheduled to be monitored by the monitoring service from a service monitor associated with the monitoring service and an application service creating, via the K8s Controller, dummy headless services that match with the one or more application pods scheduled to be monitored; and programming the service mesh with the dummy headless service information from the dummy headless services to cause the service mesh to intercept and identify that the monitoring request is going to a dummy headless service based on the one of the one or more IP addresses so as to encrypt the monitoring request.

A second example comprises installing the K8s controller into a K8s cluster which further includes the monitoring service.

In a third example according to any of the previous examples the monitoring service generates the monitoring request by detecting the one or more application pods scheduled for monitoring; programming a monitoring server to generate the monitoring request to send to the one or more application pods via the service mesh.

In a fourth example according to any of the previous examples the service mesh has been configured with information about services including one or more service IP address.

In a fifth example according to any of the previous examples the dummy headless services include a list of underlying IP addresses for the one or more application pods detected by the K8s controller.

In a sixth example according to any of the previous examples programming a service mesh proxy of the service mesh by a service mesh control plane which receives the application service information from the application service and with the dummy headless service information from the dummy headless services In a seventh example according to any of the previous examples the application service comprises a selector for determining which of the one or more application pods are backend pods for the service.

In an eighth example according to any of the previous examples programming the service mesh further comprises identifying that the monitoring request is going to the dummy headless service and being uplifted to a mutual Transport Layer Security protocol.

In a ninth example according to any of the previous examples encoding the monitoring request with the mutual Transport Layer Security protocol.

In a tenth example according to any of the previous examples on receipt of the monitoring request the one or more application pods collects one or more metrics.

An eleventh aspect comprises a Kubernetes (K8s) system including one or more clusters in which a pod monitoring service is operating, the K8s system including: a controller; one or more application pods; a service mesh; an application service; a dummy headless application service; wherein the one or more application pods are configured to receive monitoring requests from the service mesh and wherein the service mesh is configured to intercept a monitoring request to monitor one or more of the application pods from the monitoring service, the monitoring request including a destination IP address; the controller configured to detect which of the one or more application pods are scheduled to be monitored by the monitoring service from a service monitor associated with the monitoring service and the application service; the controller further configured to create dummy headless services that match with the one or more application pods scheduled to be monitored; wherein the service mesh is programmed with the dummy headless service information from the dummy headless services to identify that the intercepted monitoring request is going to a dummy headless service based on the destination IP addresses so as to encrypt the monitoring request.

In a twelfth example the monitoring service according to the eleventh example, is configured to: detect the one or more pods scheduled for monitoring; and program a monitoring server to generate the monitoring request to send to the service mesh.

In a thirteenth example according to the eleventh or twelfth example the service mesh has been configured with one or more service IP addresses.

In a fourteenth example according to any of the twelfth to thirteenth examples the dummy headless services include a list of underlying IP addresses for the one or more application pods detected by the controller.

In a fifteenth example according to any of the twelfth to fourteenth example a service mesh control plane programs a service mesh proxy of the service mesh.

In a sixteenth example according to any of the twelfth to fifteenth examples the application service comprising a selector configured to: determine which of the one or more application pods are backend pods for the service.

In a seventeenth example according to any of the twelfth to sixteenth examples programming the service mesh further comprises identifying that the monitoring request is going to the dummy headless service and being uplifted to a mutual Transport Layer Security protocol.

In an eighteenth example according to any of the twelfth to seventeenth example the encryption comprises encoding the monitoring request with the mutual Transport Layer Security protocol.

In a nineteenth example according to any of the twelfth to eighteenth examples, on receipt of the monitoring request the one or more application pods collects one or more metrics.

A twentieth example comprises one or more device-readable media with device-executable instructions that, when executed by a computing system, direct the computing system to perform for performing operations comprising: providing information to a service mesh from a Kubernetes (K8s) controller, the information to enable the service mesh to determine the IP address of one or more application pods o which a monitoring request destined for one of the one or more an IP addresses is to be sent from a monitoring service; detecting, via the K8s Controller, which of the one or more application pods are scheduled to be monitored by the monitoring service from a service monitor associated with the monitoring service and an application service; creating, via the K8s Controller, dummy headless services that match with the one or more application pods scheduled to be monitored; and programming the service mesh with the dummy headless service information from the dummy headless services to cause the service mesh to intercept and identify that the monitoring request is going to a dummy headless service based on the one of the one or more IP addresses so as to encrypt the monitoring request.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g., in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

Alternatively, or in addition, the functionality described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A method of providing information to a service mesh from a Kubernetes (K8s) controller, the information usable to enable the service mesh to determine an IP address of one or more application pods to which a monitoring request is to be sent from a monitoring service, the method comprising:
    detecting, by the K8s controller, which of the one or more application pods are scheduled to be monitored by the monitoring service via a service monitor associated with the monitoring service and an application service;
    creating, by the K8s controller, dummy headless services that match with the one or more application pods scheduled to be monitored, wherein the dummy headless services do not allocate an IP address or forward traffic; and
    programming the service mesh with information from the dummy headless services to cause the service mesh to, based on the IP address of the one or more application pods:
        intercept the monitoring request; and
        in response to determining that the monitoring request is destined to the dummy headless service, encrypt the monitoring request.

2. The method of claim 1, further comprising installing the K8s controller in a K8s cluster which includes the monitoring service.

3. The method of claim 1 wherein the monitoring service generates the monitoring request by:
    detecting the one or more application pods scheduled for monitoring; and
    programming a monitoring server to generate the monitoring request.

4. The method of claim 1, wherein the service mesh has been configured with information about services including one or more service IP addresses.

5. The method of claim 1, wherein the dummy headless services include a list of underlying IP addresses for the one or more application pods detected by the K8s controller.

6. The method of claim 1, further comprising programming a service mesh proxy of the service mesh by a service mesh control plane which receives the information from the application service and with the information from the dummy headless services.

7. The method of claim 1, wherein the application service comprises a selector to determine which of the one or more application pods are backend pods for the service.

8. The method of claim 1, wherein programming the service mesh further comprises:
    identifying that the monitoring request is going to the dummy headless service; and
    in response to the identifying, initiating a mutual Transport Layer Security protocol.

9. The method of claim 8, further comprising encoding the monitoring request with the mutual Transport Layer Security protocol.

10. The method of claim 1, further comprising:
    in response to receipt of the monitoring request, collecting, by the one or more application pods, one or more metrics.

11. A Kubernetes (K8s) system including one or more clusters in which a pod monitoring service is operating, the K8s system including:
    a controller;
    one or more application pods;
    a service mesh;
    an application service; and
    a dummy headless application service;
    the one or more application pods configured to receive monitoring requests from the service mesh;
    the service mesh configured to intercept a monitoring request to monitor one or more of the application pods via the pod monitoring service, the monitoring request including a destination IP address;
    the controller configured to:
        detect which of the one or more application pods are scheduled to be monitored by the monitoring service via a service monitor associated with the monitoring service and the application service;
        create dummy headless services that match with the one or more application pods scheduled to be monitored; and
    the service mesh programmed with information from the dummy headless services to identify that the intercepted monitoring request is going to a dummy headless service based on the destination IP addresses, and in response to identifying that the intercepted monitoring request is going to a dummy headless service based on the destination IP addresses, encrypting the monitoring request.

12. The system of claim 11 further comprising the monitoring service, which is configured to:
    detect the one or more pods scheduled for monitoring; and
    program a monitoring server to generate the monitoring request to send to the one or more application pods via the service mesh.

13. The system of claim 11, wherein the service mesh has been configured with one or more service IP addresses.

14. The system of claim 11, wherein the dummy headless services include a list of underlying IP addresses for the one or more application pods detected by the controller.

15. The system of claim 11, wherein a service mesh control plane programs a service mesh proxy of the service mesh.

16. The system of claim 11, wherein the application service comprises a selector configured to:
    determine which of the one or more application pods are backend pods for the service.

17. The system of claim 11, wherein programming the service mesh further comprises identifying that the monitoring request is going to the dummy headless service and being uplifted to a mutual Transport Layer Security protocol.

18. The system of claim 17 wherein the encryption comprises encoding the monitoring request with the mutual Transport Layer Security protocol.

19. The system of claim 11, wherein in response to receipt of the monitoring request, the one or more application pods collects one or more metrics.

20. One or more device-readable media with device-executable instructions that, when executed by a computing system, direct the computing system to perform operations comprising:

sending information to a service mesh from a Kubernetes (K8s) controller, the information usable to enable the service mesh to determine an IP address of one or more application pods to which a monitoring request is to be sent from a monitoring service, the monitoring request destined for one of the one or more IP addresses;

detecting, by the K8s controller, which of the one or more application pods are scheduled to be monitored by the monitoring service via a service monitor associated with the monitoring service and an application service;

creating, by the K8s Controller, dummy headless services that match with the one or more application pods scheduled to be monitored; and programming the service mesh with information from the dummy headless services to cause the service mesh to, based on the IP address of the one or more application pods:

intercept the monitoring request; and in response to determining that the monitoring request is destined to the dummy headless service, encrypt the monitoring request.

* * * * *